United States Patent

Ono et al.

Patent Number: 5,130,875
Date of Patent: Jul. 14, 1992

[54] MULTICHANNEL MAGNETIC HEAD HAVING A PLURALITY OF HEAD CHIPS FIXED ON A COMMON HEAD BASE

[75] Inventors: Hiroaki Ono; Tomomi Okamoto, both of Katsuta; Shinji Ozaki, Funabashi; Tsukasa Ohata, Katsuta, all of

[73] Assignee: Hitachi, Ltd., Tokyo, Japan

[21] Appl. No.: 551,011

[22] Filed: Jul. 11, 1990

[30] Foreign Application Priority Data

Jul. 12, 1989 [JP] Japan .................................. 1-177923

[51] Int. Cl.⁵ .......................... G11B 5/52; G11B 21/18
[52] U.S. Cl. ...................................................... 360/107
[58] Field of Search .................... 360/104, 107, 118, 21

[56] References Cited

U.S. PATENT DOCUMENTS

| | | | |
|---|---|---|---|
| 4,318,146 | 3/1982 | Ike et al. | 360/21 |
| 4,520,405 | 5/1985 | Sasaki et al. | 360/10.3 |
| 4,796,128 | 1/1989 | Takimoto | 360/21 |
| 4,860,132 | 8/1989 | Lorteije | 360/21 |

Primary Examiner—Robert S. Tupper
Attorney, Agent, or Firm—Antonelli, Terry Stout & Kraus

[57] ABSTRACT

In a multichannel magnetic head including a plurality of head chips secured at fixed intervals to one head base mounted on a rotating drum. Each head chip is arranged so that a center of the curvature of each head tip is positioned substantially on a straight line or an extension of the straight line connecting each head gap to tis rear gap, and each of the head chips is arranged so that the distance L between a crossing point on said straight line connecting each head gap to its rear gap and the head gap, and the radius D of the rotating drum satisfy the following relationship:

$$1.2 \geq \frac{L}{D} \geq 0.8.$$

13 Claims, 11 Drawing Sheets

LEADING HEAD　　　　TRAILING HEAD

MULTICHANNEL MAGNETIC HEAD HAVING A PLURALITY OF HEAD CHIPS FIXED ON A COMMON HEAD BASE

BACKGROUND OF THE INVENTION

The present invention relates to a magnetic head for a magnetic recording-reproducing apparatus such as a VTR and, in particular, to a construction of multichannel multiple heads.

With the advancement of image quality and increasing functions of the VTR, there have been attempts to provide a number of heads cooperable with the magnetic recording. Multichannel heads, in which a number of chips are carried on one head base are highly desirable from the point of view of the spacing of the rotating cylinder for carrying the head, the cost of the head assembly, system requirements, and so on.

Figure 5A:
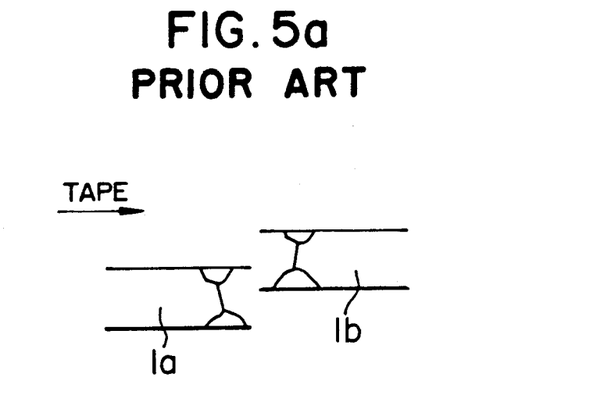
FIGS. 5a and 5b are a plan view of a sliding surface and a front view, respectively of a conventional double azimuth head.
Figure 5B:
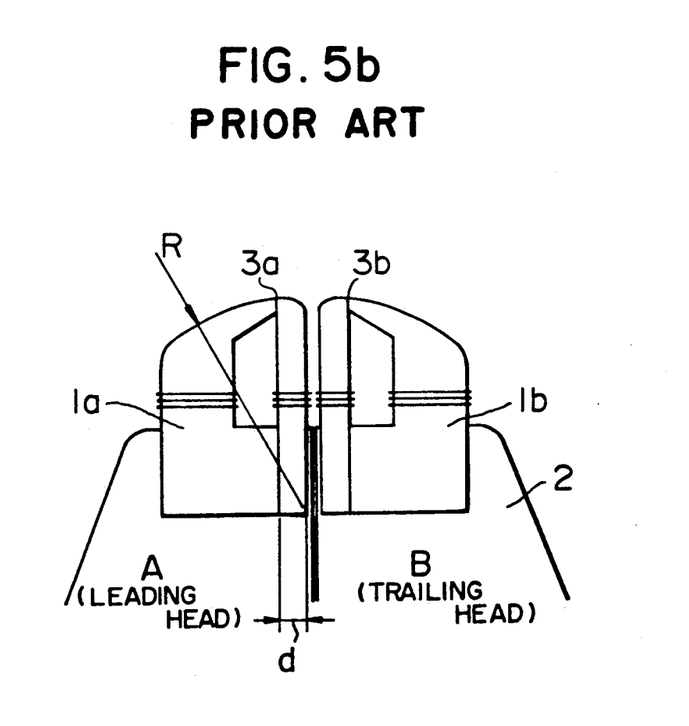

In FIGS. 5a and 5b, a conventional double azimuth head is provided for a VTR for home use. In this head, two head chips 1a and 1b are carried in proximity to each other on a head base 2 so that multiple functions can be obtained. However, such heads, for example, heads for the same purpose, recording-reproducing heads, only recording heads, or only reproducing heads are used in multiple forms and disposed on the same chip. In such heads, in order to improve the tape contact of two heads, the center of curvature R of the head tip is offset by a distance d with respect to a perpendicular line from the head gap as shown in FIG. 5b. In the abovementioned heads, since the right and left heads are in close proximity to each other at an interval of at most several hundreds μm, it has been determined that a proper tape contact can be obtained only by forming the curvature R, and such heads have now been mass produced.

Figure 6A:
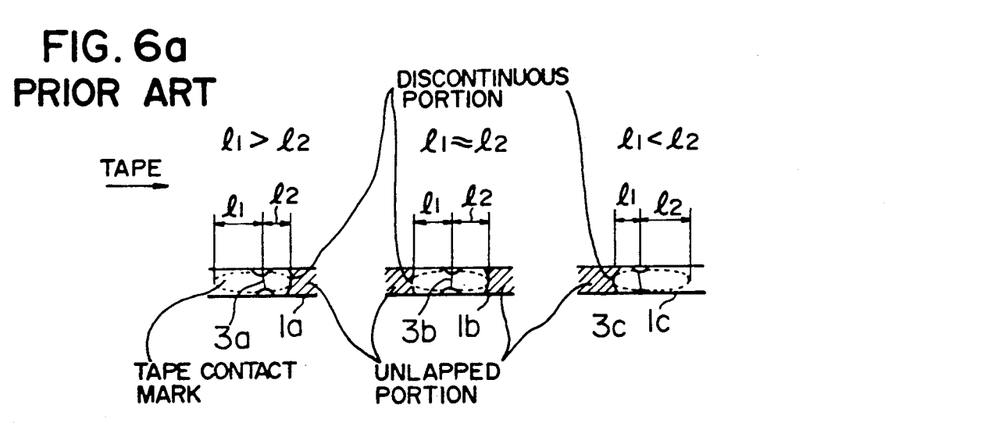
FIGS. 6a and 6b are a plan view of a sliding surface and front view, respectively, of another conventional multichannel head.
Figure 6B:
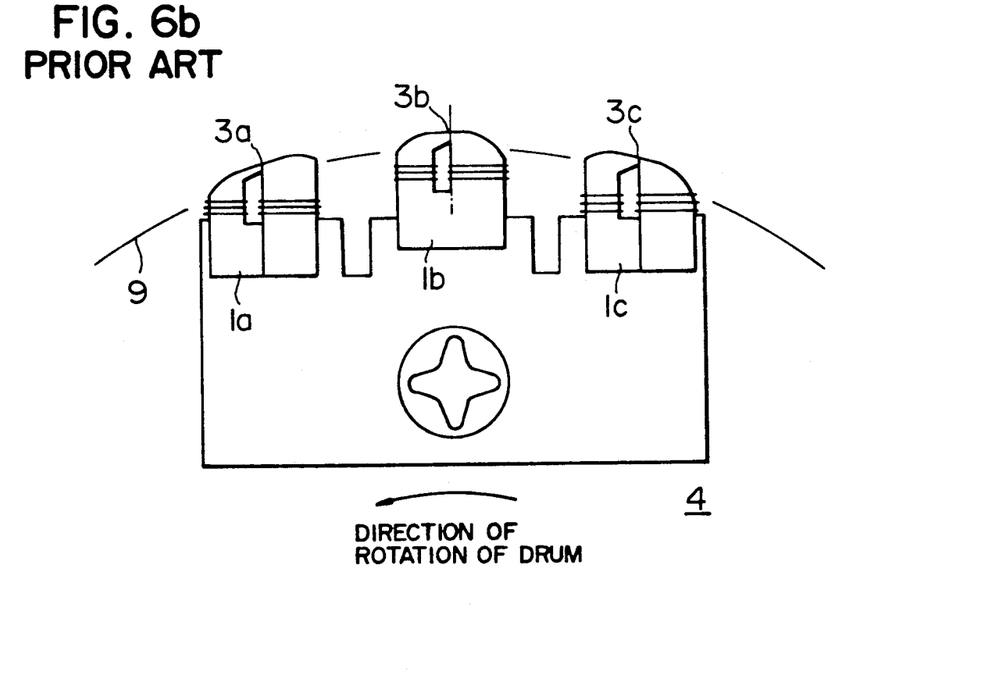

On the other hand, in multichannel heads which are used in more sophisticated VTRs for broadcast or for home use, the distance between the adjoining heads is, in some cases, over 1 mm. In FIGS. 6a and 6b, a conventional triple-channel head is shown for explanation purposes and, as a practical matter, heads having two and six channels have been used.

Figure 7A:
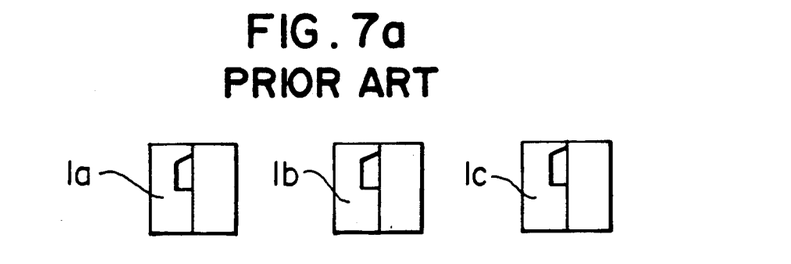
FIGS. 7b, 7c and 7d schematically illustrate the manufacturing process a conventional multichannel head.
Figure 7B:
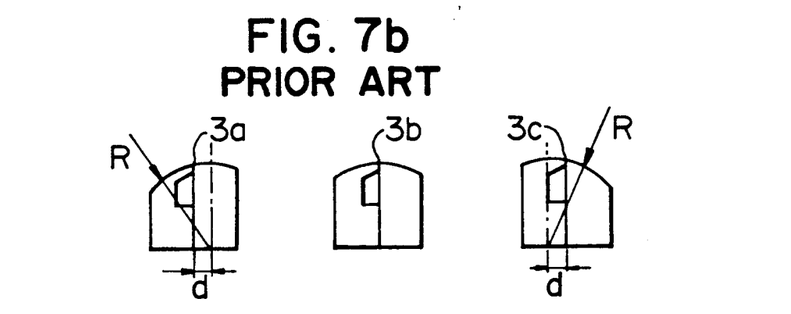
Figure 7C:
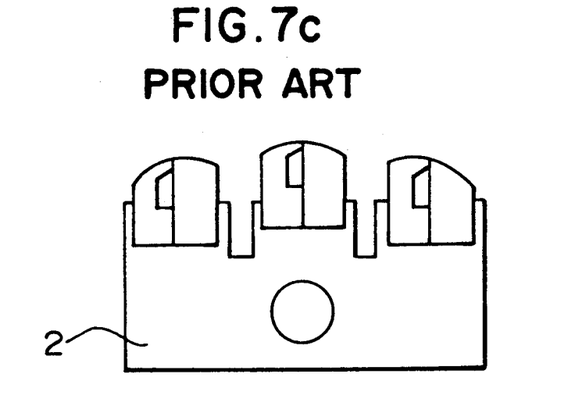
Figure 7D:
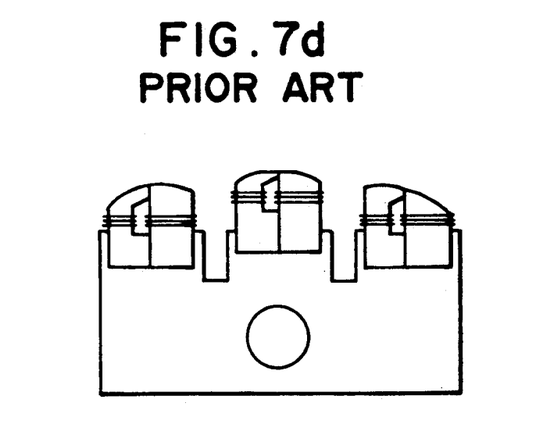

To manufacture a triple channel head, the head chips 1a, 1b and 1c of FIG. 7a are respectively ground to aspherical surface shapes as shown in FIG. 7b. In this case, the center of curvature R of each head tip is respectively offset with respect to the perpendicular line from each gap 3a, 3b and 3c by a distance d corresponding to the position where each head chip is affixed to the head base 2. Then, the head chips 1a, 1b, and 1c are affixed to the head base 2 and parallel to each other as shown in FIG. 7c. Finally, in order to cause the center of protrusion of each head chip to approximately coincide with each gap position thereby ensuring a sufficient initial contact when the head is mounted on the rotating drum, the head is lapped with a lapping tape, etc. so as to form the final shape shown in FIG. 7d.

FIGS. 6a and 6b show the above mentioned head and its sliding surfaces after the head has been mounted on the actual device so as to enable the head to slide with respect to the tape. As shown in FIG. 6b, the head chip 1a is the chip which first contacts the tape. A number of problems arise in the manufacturing of the head by the above-mentioned method.

More particularly, since the space between the head chips is over 1 mm, some portions of the surface of each head chip are not lapped (FIG. 6a) due to the shape of each head chip; therefore, the sliding surface has discontinuities at portions which are not lapped. Since the tape contact mark arrives at each discontinuity, dust is trapped at each of these portions. In particular, a significant quantity of dust is trapped at the head chip 1a positioned at the protruding side.

Furthermore, since the gap is not positioned at the center of the tape contact mark (FIG. 6a), insufficient tape contact results. Further, the tape contact varies after extended running of the tape. Since the perpendicular line from each gap does not coincide with the center of the rotating drum, the space of each gap changes, in particular, in the head chips 1a and 1c, after extended running of the tape.

Additionally, upon a recording on a tape which has once been recorded, the former recording is not completely erased if the dust is trapped in the recording head.

Figure 8A:
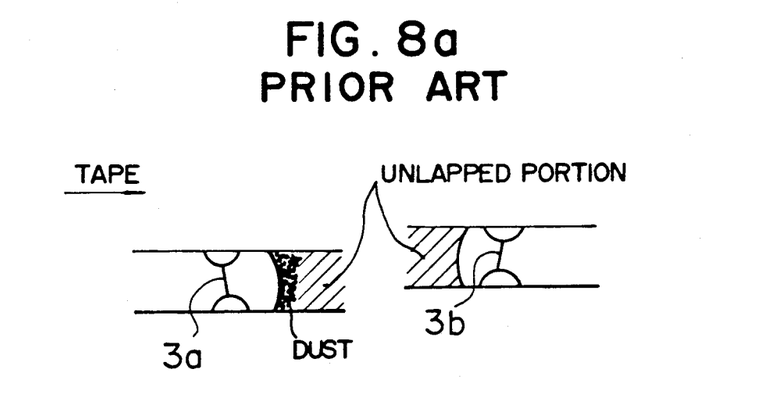
FIGS. 8a and 8b are a plan view and front view, respectively, of sliding surfaces of another conventional double azimuth head.
Figure 8B:
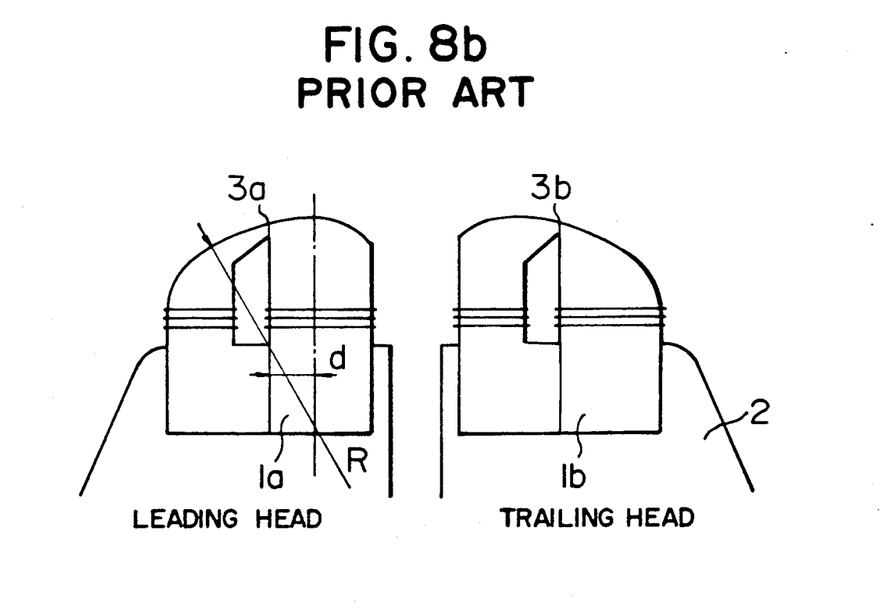

As shown in FIG. 8a, after extended running, a large quantity of dust is trapped in the unlapped portions and, more particularly, at a back of the gap of the leading head chip. If dust is trapped at this position, problems arise such as, for example, clogging of the head, reduction of the gap, etc. By virtue of such problems, the recording head sometimes does not record important information which is a significant problem in business use of the recording apparatus.

SUMMARY OF THE INVENTION

The object of the present invention essentially resides in avoiding the problems and disadvantage encountered in the prior art and to provide a multihead channel which prevents non-recording of information due to improper tape contact, clogging of the head or like even if the space between the head gaps is over 1 mm.

The above-mentioned object may be achieved in the following manner.

In order to ensure proper tape contact even after extended running, to prevent the gap space between the head chips from being changed, and to prevent discontinuities in the surface from being created in the vicinity of the tap contact mark of the tape sliding portion, a plurality of head chips, having curvatures uniformly formed on the right and left sides centered at the gaps, are arranged radially with respect to a point coinciding substantially with the center of the rotating drum which carries the head chip through a head base, and are arranged and affixed so that the distances from the positions of the head gaps to the radiation center are equal to each other.

An erase head is disposed at the leading position in a rotating direction of the drum of the multichannel head.

With the gap position of each head chip coinciding substantially with the center of the protruding tip of the head chip, since each head chip has a curvature R uniformly formed on the right and left sides centered at the gap, $d \approx 0$, the tape contact marks due to extended running are uniformly formed on the right and left sides. As a result the proper tape contact is maintained for an extended time period. Since the center of the rotating drum is positioned on the extension of the perpendicular line from the gap of each head chip, the distance between the gaps of the head chips does not change even after extended running. Since each head chip is affixed to the head base only after the head chip has been uniformly ground to have a rounded surface on right and left sides of the head chip, discontinuities in the surface are not created on the sliding surface of the head so that less dust is trapped thereby.

Since the erase head is disposed just before the recording head, no former recording on the tape is left to be erased. Moreover, since the erase head is disposed just before the recording head, the erase head can play a role in cleaning dust on the tape so that adherence of dust to the recording head, clogging of the head and so on are considerably reduced.

DETAILED DESCRIPTION OF THE PREFERRED EMBODIMENT:

Following, the embodiments of the present invention will be described in detail with reference to the attached drawings.

In the drawings, the reference numerals $1a$, $1b$ and $1c$ are head chips. The reference numerals $3a$, $3b$ and $3c$ are head gaps of the respective chips $1a$, $1b$, $1c$. Each space between the respective gaps of the head chips $1a$, $1b$, $1c$ is greater than 1 mm. The centers $O_1$, $O_2$ and $O_3$ of the curvatures R of the tips of the head chips $1a$, $1b$, and $1c$ are positioned within an eccentric deviation $|d| \leq 80$ $\mu$m with respect to a perpendicular line from each gap, because the tape contact is insufficient, if the deviation is greater than 80$\mu$m. Further, each head chip $1a$, $1b$, $1c$ is radially affixed to the head base so as to cross substantially at the same point $O_o$ (within ±2 mm) on the extension of the perpendicular line from the gap. Further, the point $O_o$ coincides substantially with the center of the drum on which the head chip is mounted (within ±5 mm).

Figure 4A:
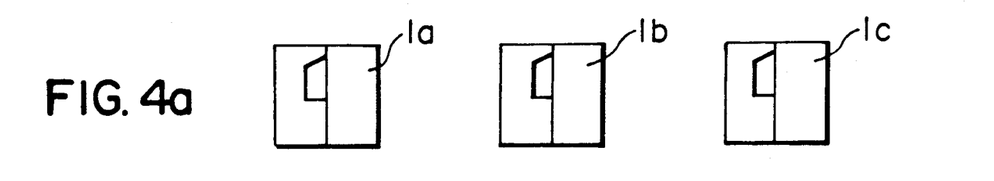
FIGS. 4a, 4b and 4c are schematic views of the manufacturing process of the multichannel head of the present invention.
Figure 4B:
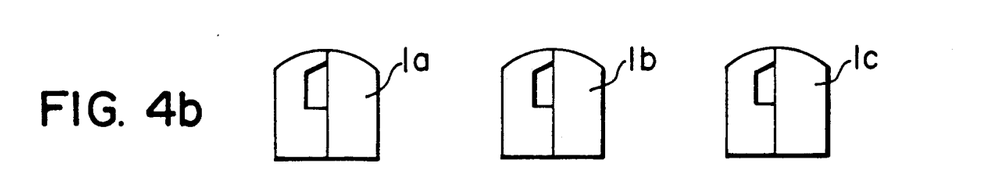
Figure 4C:
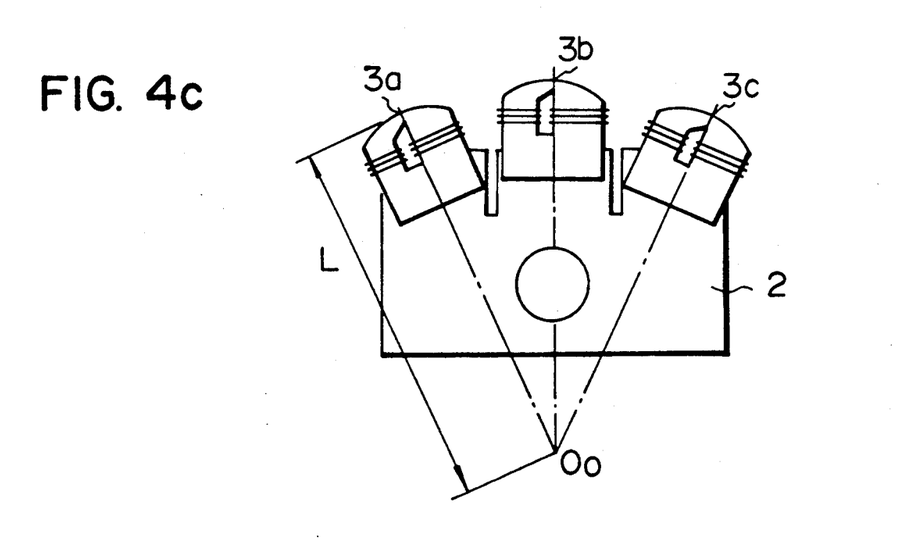
Figure 11:
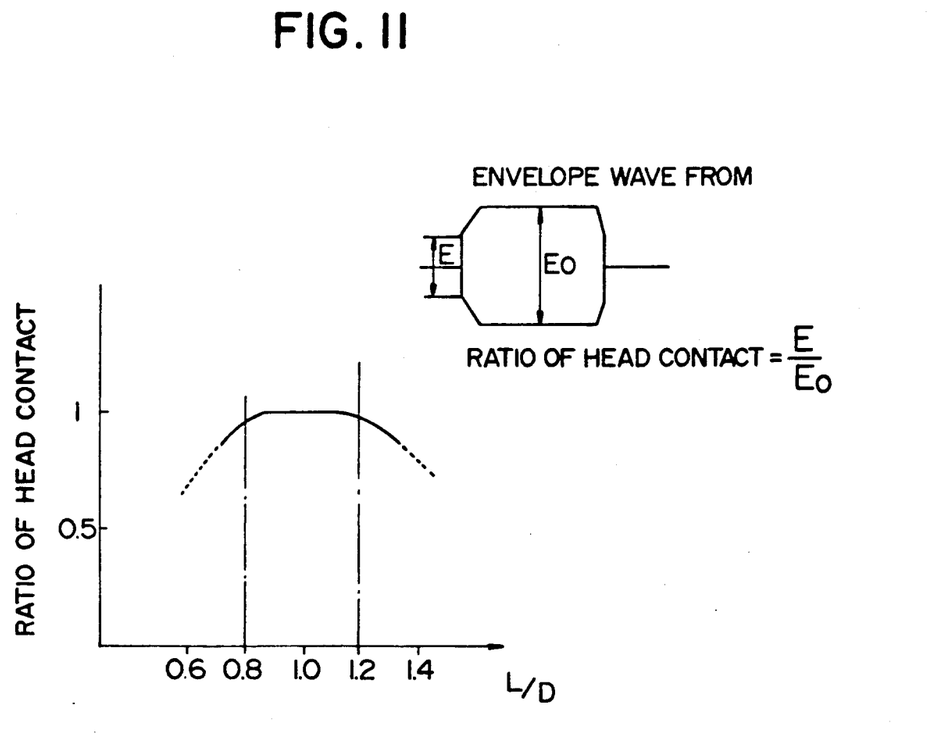
FIG. 11 is a graphical illustration for deriving a related expression in the claims of the present invention.

Each head chip $1a$, $1b$, $1c$ in FIG. 4a is rounded by grinding so that the center of curvature R of the tip of each head chip $1a$, $1b$, $1c$ is positioned on the perpendicular line from the gap position of the chip (FIG. 4b). Then each head chip $1a$, $1b$, $1c$ is radially affixed onto the head base centering around the point $O_o$ with the perpendicular lines from the gap positions of the head chips $1a$, $1b$, $1c$ cross each other (FIG. 4c). In this case, the distance between the gaps of the head chips fall within the system specification. Each head chip $1a$, $1b$, $1c$ is fixed so that the distance L (FIG. 4i c) between each of the gaps $3a$, $3b$, and $3c$ and the point $O_o$ is $L=O_o-3a \approx O_o-3b \approx O_o-3c$. Then the distance L between each gap $3a$, $3b$, $3c$ and the point $O_o$ is the length conforming to the following expression because the tape contact or touch is insufficient in a range other than the above mentioned expression as shown in FIG. 11.

$$1.2 \geq \frac{L}{D} \geq 0.8$$

In each head chip $1a$, $1b$, $1c$, since the position of each head gap $3a$, $3b$, $3c$ substantially coincides with the center of the protruding tip of each head chip $1a$, $1b$, $1c$ and the curvature R of each head chip $1a$, $1b$, $1c$ is uniformly formed on the right and left sides centered at the gap the tap contact marks are formed substantially uniform on the right and left sides ($l_1 \sim l_2$) after an extended running. Therefore, the tape contact or touch is maintained at a proper level for a long period of time. Since the center of the rotating drum is positioned on the perpendicular line from the gap, the distance between the gaps $3a$, $3b$, $3c$ of the head chip $1a$, $1b$, $1c$ does not change for a long period of time.

According to the present invention, since lapping for an initial running-in is not required after each head chip $1a$, $1b$, $1c$ has been affixed to the head base, there is no unlapped portion as in the prior art. Thus, there are no discontinuities in the surface, so clogging of the head, etc. due to an accumulation of dust can be avoided. Though the head chip $1a$, $1b$, $1c$ are manufactured in the same process in this embodiment, the present invention is not limited only to said process.

Figure 1A:
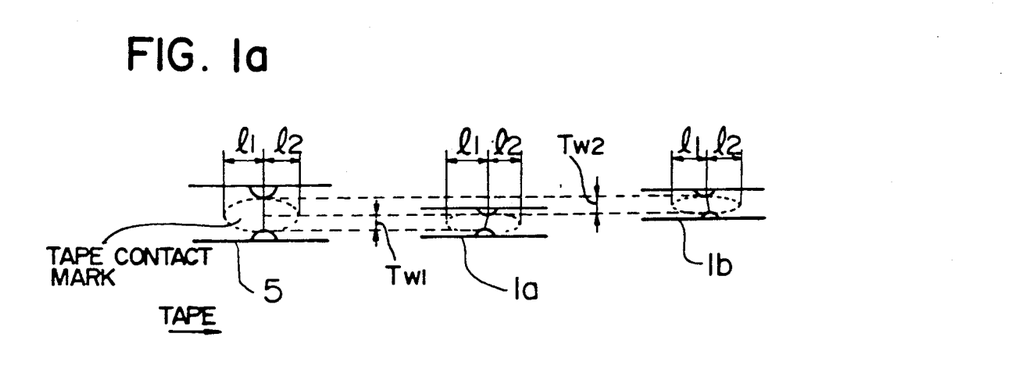
FIGS. 1a and 1b are a plan view of a sliding surface and a front view, respectively, of a multichannel head according to the present invention.
Figure 1B:
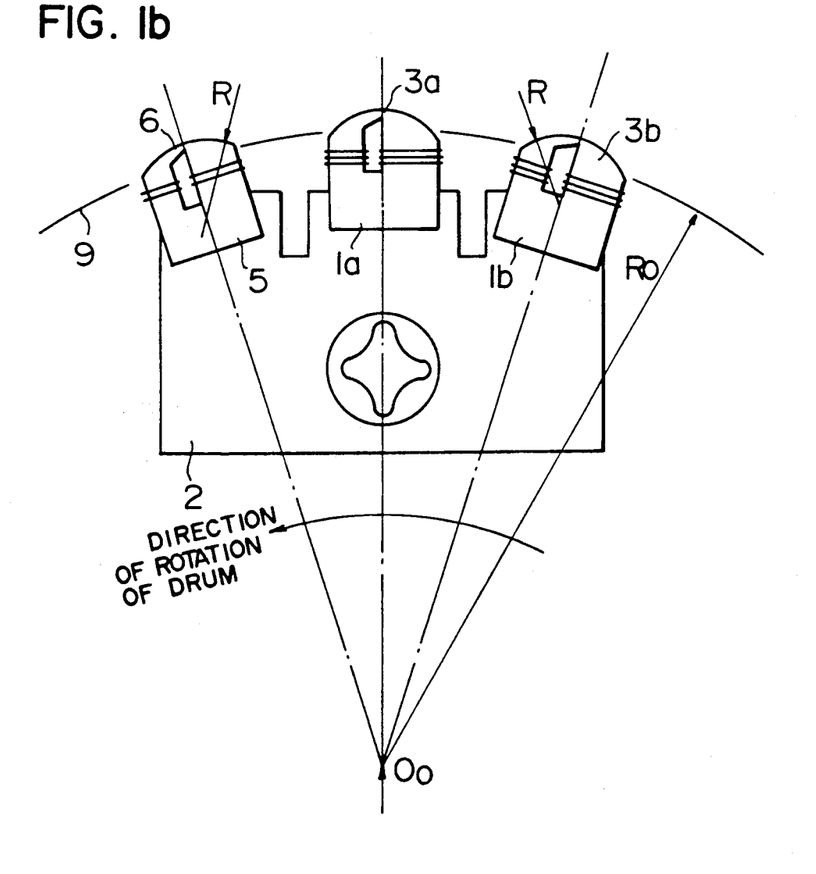

In FIGS. 1a and 1b, the leading head is an erase head 5 and the trailing heads $1a$, $1b$ constitute a double azimuth head.

FIG. 1a shows a sliding surface of each head chip. As apparent from FIGS. 1a and 1b, the leading erase head chip 5 is disposed to erase tracks $T_{w1}$ and $T_{w2}$ of the two trailing head chips $1a$ and $1b$. Thus, the former recording which is not erased due to clogging of the recording head, and improper recording are practically non-existent.

Figure 2A:
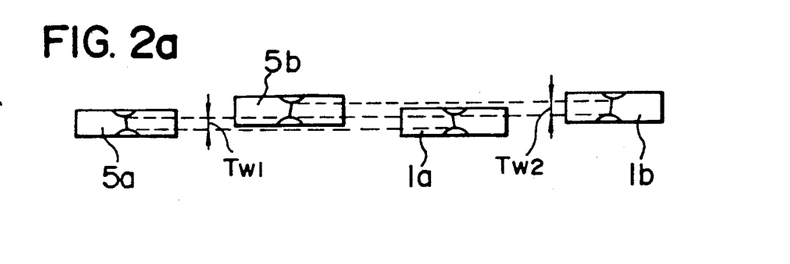
FIGS. 2a and 2b are a plan view of a sliding surface and a front view, respectively, of a multichannel head according to another embodiment of the present invention.
Figure 2B:
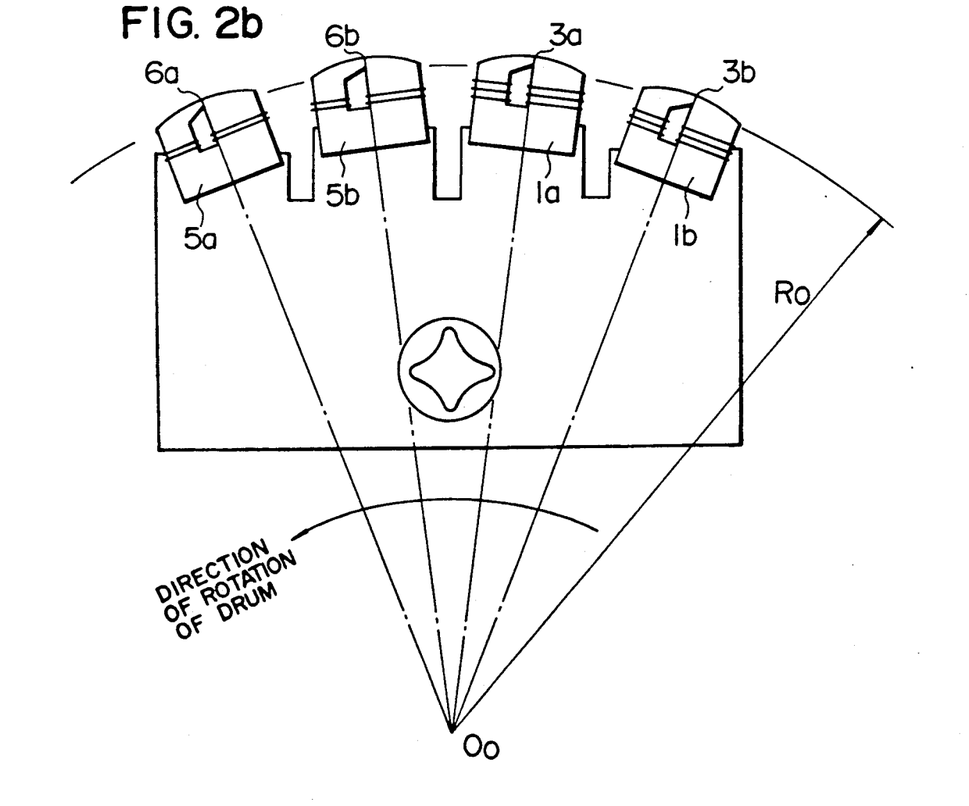
Figure 3A:
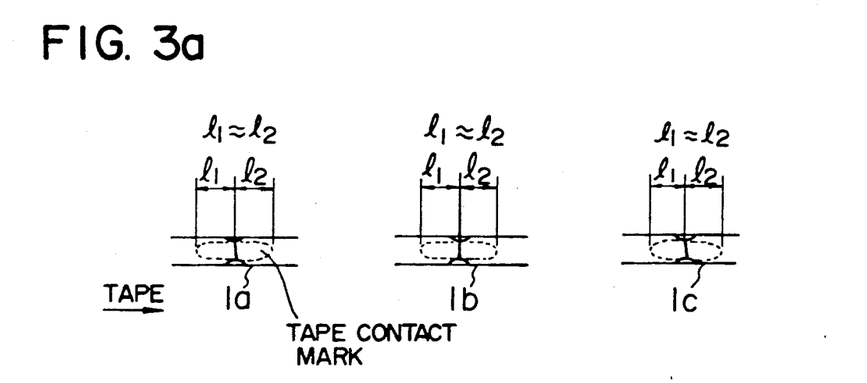
FIGS. 3a and 3b are a plan view of a sliding surface and a front view, respectively, of a multichannel head according to a further embodiment of the present invention.
Figure 3B:
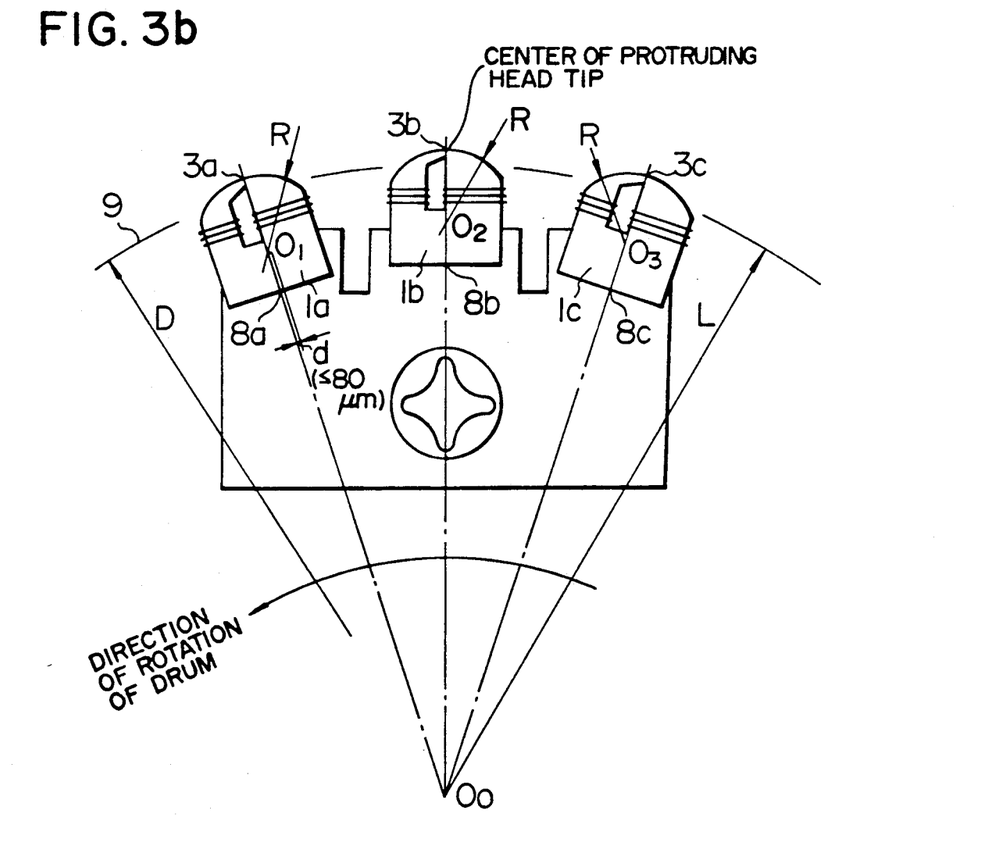

FIGS. 2a and 2b show an embodiment in which an erase head chip is disposed for every recording track. With such an arrangement, even if editing is executed for every track, the above mentioned effect can be expected.

Figure 10A:
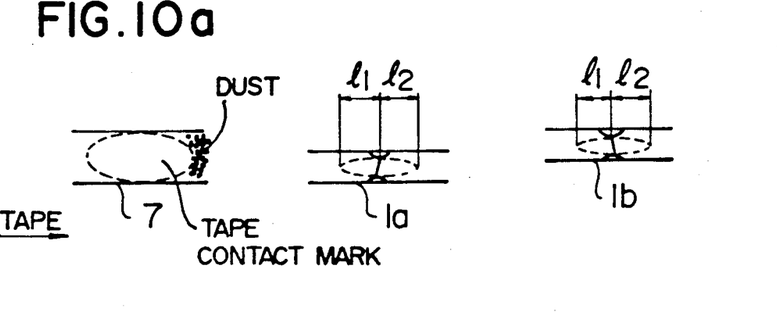
FIGS. 10a and 10b are a plan view of a sliding surface and a front view, respectively, of a multichannel head according to embodiment of the present invention.
Figure 10B:
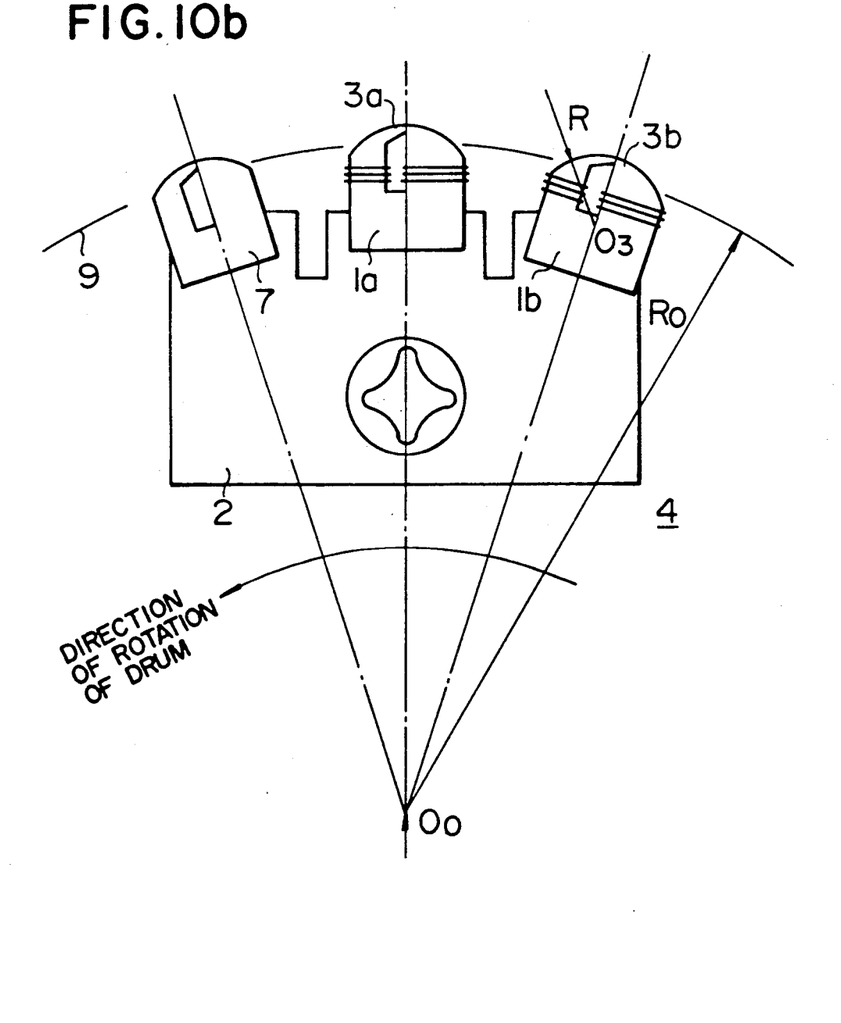

FIGS. 10a and 10b show an embodiment in which the leading head chip is a dummy head chip 7. As described above, when the multichannel head mounted on the rotating drum is subjected to running for a long period of time, a large quantity of dust is trapped or accumulated on the tape outlet side of the leading head chip. Since, in the trailing head chips, the positions where dust has been removed by the leading head chip on the tape are scanned, very little dust is captured by the trailing head chips. By providing a leading head chip used as a dummy head 7 for cleaning dust and two trailing head chips 1a and 1b which are arranged as a double azimuth head, a multi-channel head 4, in which clogging of the head is remarkably reduced, can be obtained.

Figure 9A:
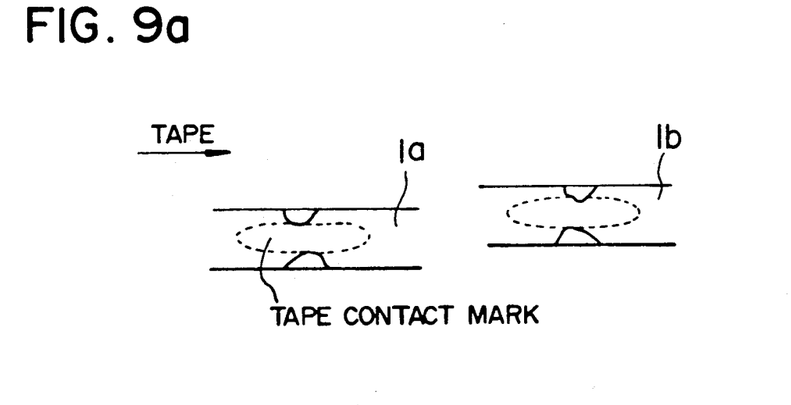
FIGS. 9a 9b are a plan view of a sliding surface and a front view, respectively, of a double azimuth head of the present invention.
Figure 9B:
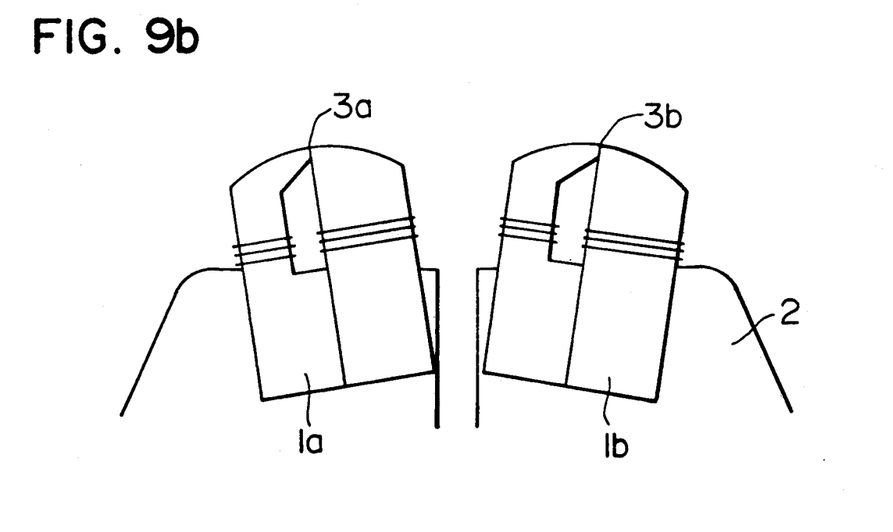

In the above-described embodiment, three head chips are mounted on one head base. The present invention is not limited to such structure and, for example, a double azimuth head as shown in FIGS. 9a, 9b can be used. Since the gap is positioned substantially at the central portion of the contact, proper tape touch or contact can be maintained for a long period of time.

Further, even when more than four head chips are mounted on one head base, a similar effect is obtained because the head chips can be affixed by a similar method. Further, with a one chip double azimuth head, a multi-channel head can also be obtained by affixing each head chip in the above described manner. Though magnetic heads of a wound coil type have been explained, the present invention is not limited to such type. For example, in a magnetic head of a coil patterning type, a thin film head and the like, a similar effect can also be obtained by a similar affixing manner as described above. In the schematic views of the sliding surfaces of all drawings described above, ferrite heads have been shown; however, the present invention is not limited to such heads. For example, a composite magnetic head in which ferrite and a magneto-metallic material are used as a core material, a metal head in which a magneto-metallic material is used as a core material, a thin film head which is made of a magneto-metallic material by thin film processing, and so on can all be used. In the above described embodiments, each head chip is provided with a relative discrepancy, as viewed from the sliding surface. The present invention is not limited to such structure but it may be provided with no discrepancy, or with a reverse discrepancy. In all above-described embodiments, each leading head chip is disposed on the left side, as viewed in the drawings. However, the head chip may be disposed on a right side, depending on the direction of rotation of the rotating drum. Then, the positions where the dust is trapped is reversed.

Since the erase head chip is disposed close to the recording head chip in front thereof, the erase head chip erases the former recording track and removes dust, etc. on the tape, before the tracks are traced by the recording head chip, so that improper recording can be substantially avoided.

Since a plurality of head chips are arranged radially from a point substantially coinciding with the center of the rotating drum on which the head chips are mounted on one head base, and the head chips are affixed so that the distances between the positions of the gaps of the head chips and radiation center are equal to each other, the position of the gap of each head chip substantially coincides with the center of the projection of the head chip. Since the curvature R of each head chip is uniformly formed on the right and left sides centered at the gap, that is, with no eccentric deviation, the tape contact marks are substantially uniformly formed on the right and left side after running for a long period of time. Therefore, the tape touch or contact is proper for a long period of time. Since the center of the rotating drum is positioned on the extension of the perpendicular line from the gap of each head chip, the distance between the gap of the head chips does not change even after extended running. Since the lapping process for initial running-in is not required after the head chips have been affixed to the head base, there is no unlapped portion as in the prior art. Thus, there exists no discontinuities in the sliding surface so that problems such as, for example, clogging of the head chips etc. due to trapped dust do not occur.

While we have shown and described several embodiments in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

What is claimed is:

1. A multichannel magnetic head including a plurality of head chips secured at fixed intervals to one head base mounted on a rotating drum, the multichannel magnetic head comprising:
    at least one erase head chip disposed in a first position of the magnetic head, as viewed in a direction of rotation of said rotation drum so as to erase prestored signals or data; and
    exclusively recording or recordingreproducing head chips disposed next to said erase head chip, as viewed in the direction of rotation of said rotating drum so as to respectively exclusively execute recording or recording-reproducing, and
    wherein a radius of said rotating drum is determined in accordance with the following relationship:

$$1.2 \geq \frac{L}{D} \geq 0.8,$$

L = a distance between a crossing point of an extension of a line connecting a rear gap and head gap between the respective head chips, and
p = a radius of the rotating drum.

2. A multichannel magnetic head according to claim 1, wherein at least two erase head chips are arranged on said head base; and wherein head chips having substantially the same track trace as the track trace of each of said erase head chips are arranged on said head base.

3. A multichannel magnetic head according to claim 1, wherein at least two exclusively recording or recording-reproducing head chips are arranged on the head base.

4. A multichannel magnetic head according to claim 1, wherein a width of said track of said head chip positioned in the first place in the direction of rotation of said drum position is broader than a width of the following head chips, as viewed in a direction of rotation of said rotating drum.

5. A multichannel magnetic head according to claim 1, wherein material of a core of head chips following the head chip disposed in the first position differs from a material of a core of said head chip disposed at said first position.

6. A multichange magnetic head including a plurality of head chips secured at fixed intervals to one head base mounted on a rotating drum, the multichannel magnetic head comprising:
    at least one erase head chip disposed in a first position of the magnetic head, as viewed in a direction of rotation of said rotating drum so as to erase prestored signals or data; and
    exclusively recording or recording-reproducing head chips disposed next to said erase head chip, as viewed in the direction of rotation of said rotating drum so as to respectively exclusively execute recording or recordingreproducing.

each of said head chips is arranged so that a center of curvature of each head tip in a vicinity of its head gap is positioned substantially on a line or an extension of a line connecting each head gap to a rear gap; and wherein a distance L between a crossing point on the extension of said line connecting each head gap to rear gap and said head gap, a radius D of said rotating drum on which said head base is mounted is determined in accordance with the following relationship:

$$1.2 \geq \frac{L}{D} \geq 0.8.$$

7. A multichannel magnetic head including a plurality of head chips secured at fixed intervals to one head base mounted on a rotating drum, the multichannel magnetic head comprising:

at least one erase head chip disposed in a first position of the magnetic head, as viewed in a direction of rotation of said rotating drum so as to erase prestored signals or data; and exclusively recording or recording-reproducing head chips disposed next to said erase head chip, as viewed in the direction of rotation of said rotating drum so as to respectively exclusively execute recording or recordingreproducing.

wherein the head chip disposed at said first place in the direction of rotation of said drum position includes a dummy head chip.

8. A multichannel magnetic head including a plurality of head chips secured at fixed intervals to one head base mounted on a rotating drum, wherein each of said head chips is arranged so that a center of curvature of each head tip in a vicinity of a head gap is positioned substantially on a line or an extension of said line connecting each head gap to a rear gap; and wherein when the a distance L between a crossing point on said line connecting each head gap to its rear gap and said head gap and a radius D of said rotating drum is determined in accordance with the following relationship:

$$1.2 \geq \frac{L}{D} \geq 0.8.$$

9. A multichannel magnetic head according to claim 8, wherein at least two erase head chips are arranged on said head base; and wherein head chips having substantially the same track trace as the track trace of each of said erase head chips are arranged on said head base.

10. A multichannel magnetic head according to claim 8, wherein at least two exclusively recording or recording-reproducing head chips are arranged on said head base.

11. A multichannel magnetic head according to claim 8, wherein a width of a track of one of said head chips positioned in a first position, as viewed in a direction of rotation of said rotating drum is broader than a width of following head chips, as viewed in the direction of rotation of said rotating drum.

12. A multichannel magnetic head according to claim 8, wherein material of a core of the following head chips differs from a material of a core of said head chip disposed at said first position.

13. A multichannel magnetic head according to claim 8, wherein the head chip disposed at the first position includes a dummy head chip.

* * * * *